United States Patent
Chavali et al.

(10) Patent No.: US 9,491,125 B2
(45) Date of Patent: Nov. 8, 2016

(54) SYSTEM AND METHOD FOR MULTI-CHANNEL DELIVERY OF TRANSFORMED AND AUGMENTED MESSAGES IN REAL-TIME

(71) Applicant: Halosys Technologies Inc., Santa Clara, CA (US)

(72) Inventors: Sriram Chavali, Fremont, CA (US); Srikanth Chavali, Fremont, CA (US); Avinash Harsh, Sunnyvale, CA (US)

(73) Assignee: Halosys Technologies Inc., Santa Clara, CA (US)

( * ) Notice: Subject to any disclaimer, the term of this patent is extended or adjusted under 35 U.S.C. 154(b) by 118 days.

(21) Appl. No.: 14/268,882

(22) Filed: May 2, 2014

(65) Prior Publication Data
US 2015/0319116 A1   Nov. 5, 2015

(51) Int. Cl.
  *H04L 12/58* (2006.01)
  *G06F 15/16* (2006.01)
  *H04L 12/18* (2006.01)

(52) U.S. Cl.
  CPC ......... *H04L 51/046* (2013.01); *H04L 12/1895* (2013.01); *H04L 51/20* (2013.01); *H04L 51/24* (2013.01); *H04L 51/063* (2013.01)

(58) Field of Classification Search
  CPC .............................. H04L 51/24; H04L 51/046
  USPC .......................... 709/206, 207, 208, 219, 230
  See application file for complete search history.

(56) References Cited

U.S. PATENT DOCUMENTS

| | | | | |
|---|---|---|---|---|
| 7,215,748 | B2* | 5/2007 | Ngo | H04L 12/2602 379/112.01 |
| 2006/0234730 | A1* | 10/2006 | Bibr | H04L 67/2823 455/466 |
| 2008/0163247 | A1* | 7/2008 | Musial | G06F 21/77 719/313 |
| 2014/0136620 | A1* | 5/2014 | Son | H04L 69/08 709/204 |

OTHER PUBLICATIONS

"Surf Control Instant Message Filter"—Surf Control, Jun. 2004 ftp://ftp.veracomp.pl/marketing/_Surfcontrol/InstantMessage_datasheet.pdf.*

* cited by examiner

*Primary Examiner* — Randy Scott

(57) ABSTRACT

In a system of interconnected enterprise apps, a business data object maintained by a server undergoes a life cycle event which triggers a message notification. All messages between client applications and the server are intercepted, and a configurable rules engine and message processing filters govern the transformation and delivery of each message according to each recipient's role, application, and login state. Messages can be enhanced by adding contextual information and details from other messages and/or information retrieved from enterprise back-end systems according to the rules. The transformation and delivery of messages occurs in real-time across multiple channels, platforms, and users.

3 Claims, 10 Drawing Sheets

SYSTEM AND METHOD FOR MULTI-CHANNEL DELIVERY OF TRANSFORMED AND AUGMENTED MESSAGES IN REAL-TIME

COPYRIGHT NOTICE

A portion of the disclosure of this patent document contains material that may be subject to copyright protection. The copyright owner has no objection to the facsimile reproduction by anyone of the patent document or the patent disclosure as it appears in the Patent and Trademark Office patent file or records, but otherwise reserves all copyright rights.

TECHNICAL FIELD

The present application relates to real-time notifications in a system of interconnected enterprise applications wherein that shares data objects among the applications. More specifically, the present application relates to transforming and augmenting notification messages into context-specific and scope-specific messages.

BACKGROUND

In modern business enterprises, IT data systems may comprise multiple applications executing on multiple hardware and software platforms. Various solutions exist for managing and sharing business data among such disparate systems. For example, ETL (extract, transform, load) systems are commonly employed to integrate data from multiple sources for purposes such as data warehousing, analysis, and business intelligence. EAI (enterprise application integration) is a more transaction-oriented approach, and EAI middleware may employ asynchronous message queues and data transformations to manage end-to-end business processes and workflows. Cloud-based EAI solutions may be employed in conjunction with SaaS (software as a service) applications. Highly integrated application suites, such as CRM (customer relationship management) and ERP (enterprise resource planning) solutions also exist, and these may include modular components as well as custom integrations that may use point-to-point, message broker, and ESB (enterprise service bus) architectures.

With the proliferation of mobile computing devices such as smartphones and tablet computing devices, there has been an increase in mobile application use, fueled by increases in bandwidth on mobile networks, larger displays with high resolutions on the devices, and improved connectivity and processing power. The mobile client applications or "apps" may be designed to interface in real-time with enterprise business software as well as with backend systems. Such apps may be simpler, lighter mobile versions of business software applications with relatively limited functionality. Alternatively, the mobile apps may have dedicated functions related to specific business processes, or may be companion apps with appropriate connectors.

Many prior art integration solutions utilize asynchronous message queues to manage business processes and workflows. Business processes incorporating mobile computing devices and mobile apps, however, may require a request and response message exchange pattern and thus real-time message processing is needed. In some cases, if a user is not logged in to a mobile app, it may be desirable to send a notification through an alternate channel in real-time, such as by SMS. Utilizing persistent IP connections to the Internet, mobile apps may deliver messages and notifications using different and alternative channels, such as email, SMS, and other push notification services, allowing message processing in real-time.

SUMMARY

In one embodiment a method is disclosed for processing messages in a system of multiple client applications, a server, and one or more back-end systems. According to the disclosed method, the server receives a first message from a first client application. The first message triggers a life cycle event for a data object managed by the server. The data object may be maintained on a back-end system that is communicatively coupled to the server. The disclosed method also comprises applying a configurable message filter to the first message to create a context-specific transformed message that includes a portion of the contextual information, and delivering the transformed message in real-time to a recipient using a second client application. Either one or both of the first and second client applications may be a mobile application executing on a mobile device. The contextual information may comprise, for example, user-identifying information for a user of one of the client applications, device-identifying information for a device executing one of the client applications, location information for a user of one of the client applications, and information stored on a back-end system that is communicatively coupled to the server. Applying the configurable message filter may serve to determine the portion of the contextual information that is included in the transformed message. This determination may be based on, for example, any combination of the recipient's role, the recipient's application, and the recipient's status. The transformed message may alternatively be delivered to the recipient using a secondary delivery channel that is not part of the second client application. The method may also comprise receiving at the server from a third client application a second message, obtaining additional contextual information associated with the second message, applying a configurable message filter to the second message to determine a portion of the additional contextual information to be included in the transformed message, and including in the transformed message the portion of the additional contextual information associated with the second message.

In another embodiment, a system for processing and transforming messages is disclosed. The system may comprise a first client application, a second client application, a set of configurable message filters, and a server communicatively coupled to the first and second client applications. According to this embodiment of the disclosed subject matter, the server is configured to perform a number of functions, including receiving a first message from the first client application. The first message triggers a life cycle event for a data object managed by the server, although the data object may actually be maintained on a back-end system that is communicatively coupled to the server. The server is also configured to obtain contextual information associated with the first message, where the contextual information may comprise, for example, user-identifying information for a user of one of the client applications, device-identifying information for a device executing one of the client applications, location information for a user of one of the client applications, and information stored on the back-end system. The server is also further configured to apply one of the set of configurable message filters to the first message to create a context-specific transformed message that includes a portion of the contextual information. Applying one of the set of configurable message filters may serve to determine the portion of the contextual information that is included in the transformed message. This determination may be based on, for example, any combination of the recipient's role, the recipient's application, and the recipient's status. The server is also further configured to deliver the transformed message in real-time to a recipient using the second client application. Either one or both of the first and second client applications may be a mobile application executing on a mobile device. The server may also be further configured to deliver the transformed message in real-time to a recipient using a second client application using a secondary delivery channel that is not part of the second client application. The server may also be further configured to receive from a third client application a second message, obtain additional contextual information associated with the second message, apply a second of the set of configurable message filters to the second message to determine a portion of the additional contextual information to be included in the transformed message, and include in the transformed message the portion of the additional contextual information associated with the second message.

In another embodiment, a method is disclosed for processing messages in a system of multiple client applications, a server, and one or more back-end systems. According to this embodiment, the method comprises configuring at a server a message filter for creating a notification of a life cycle event for a data object maintained by a back-end system communicatively coupled to the server and receiving at the server a first message from a first client application. The first message signifies the life cycle event for the data object. The disclosed method also comprises obtaining contextual information associated with the first message. The contextual information may comprise, for example, user-identifying information for a user of one of the client applications, device-identifying information for a device executing one of the client applications, location information for a user of one of the client applications, and information stored on the back-end system. The disclosed method also comprises applying the message filter to the first message to create a context-specific notification that includes a portion of the contextual information. Applying the message filter may serve to determine the portion of the contextual information included in the notification based on one or more of the following: the recipient's role, the recipient's application, and the recipient's status. The disclosed method also comprises delivering the notification in real-time to a specific recipient using a second client application. According to this embodiment, either one of the client applications may be a mobile application executing on a mobile device. The notification may alternatively be delivered to the recipient using a secondary delivery channel that is not part of the second client application. The disclose method may also further comprise configuring at the server a second message filter, receiving at the server from a third client application a second message, obtaining additional contextual information associated with the second message, applying the second message filter to the second message to determine a portion of the additional contextual information to be included in the notification, and including in the notification the portion of the additional contextual information associated with the second message.

BRIEF DESCRIPTION OF DRAWINGS

The foregoing summary, as well as the following detailed description, will be better understood when read in conjunction with the appended drawings. For the purpose of illustrating the invention, there are shown in the drawings examples that are presently preferred. It should be understood, however, that the invention is not limited to the precise arrangements and instrumentalities shown. In the drawings.

DETAILED DESCRIPTION

Reference will now be made in detail to the present examples of the invention illustrated in the accompanying drawings. Wherever possible, the same reference numbers will be used throughout the drawings to refer to the same or like elements.

Figure 1A:
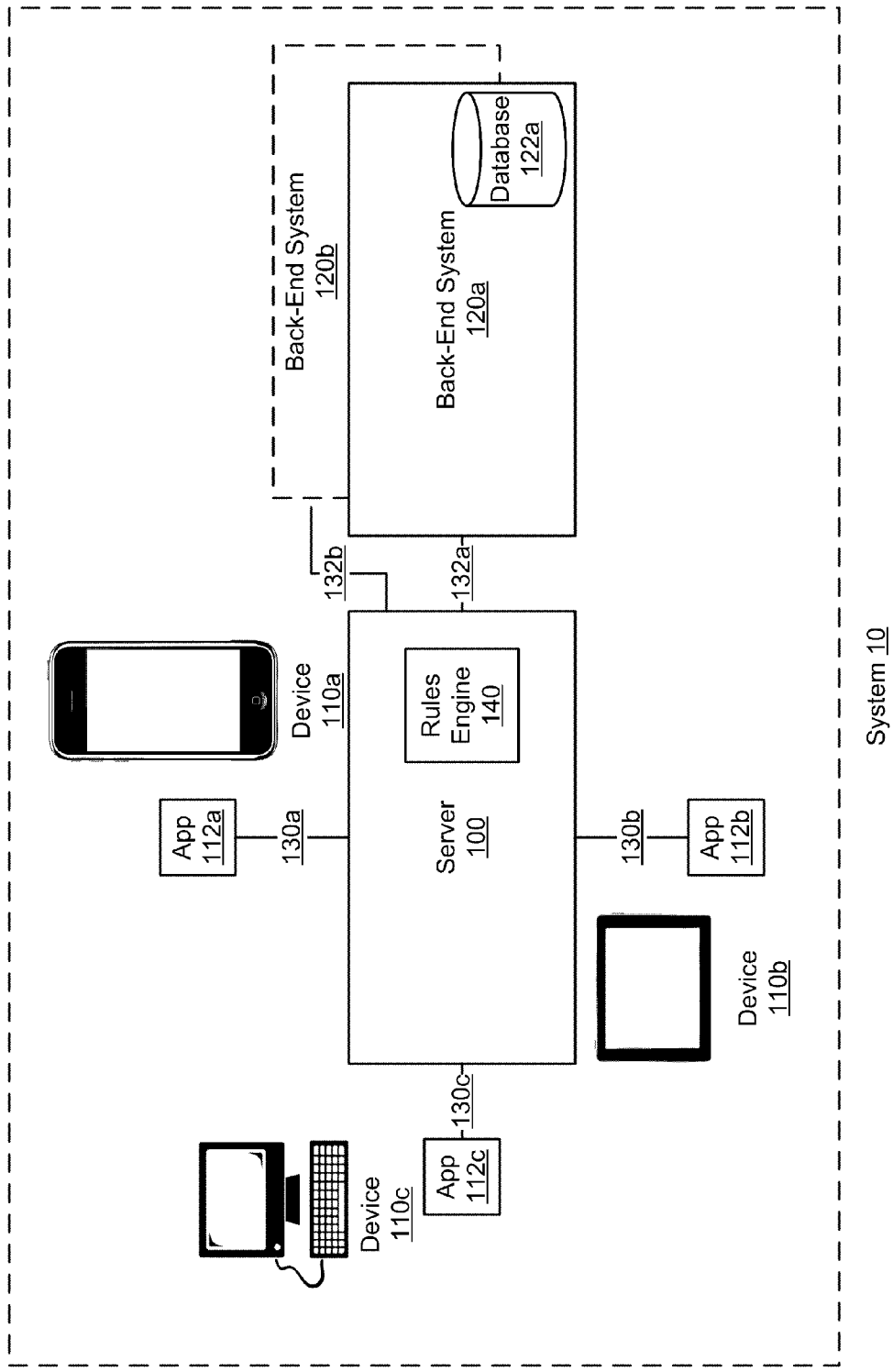
FIG. 1A illustrates an example of a system for transforming and augmenting messages shared among applications in real-time according to an embodiment of the disclosed subject matter.

FIG. 1A illustrates an example system 10 for transforming and augmenting messages shared among applications in real-time according to an embodiment of the disclosed subject matter. System 10 comprises server 100 running various applications (not shown). Server 100 further comprises rules engine 140. System 10 also comprises various client applications 112 (shown here as app 112a, app 112b, and app 112c) running on various devices 110 (shown here as device 110a, device 110b, and device 110c), including but not limited to personal computers (PCs), tablet devices, mobile phones, and other personal computing devices and portable communications devices. As shown here, app 112a (hereinafter also referred to as "App1") is running on device 110a, which is a mobile phone, such as an Apple iPhone™ running the iOS™ operating system, app 112b (hereinafter also referred to as "App2") is running on a tablet device 110b running either the Android™ operating system or iOS operating system, and app 112c (hereinafter also referred to as "App3") is a web application running in a web browser on device 110c, which is a PC. The terms "client application 112" and "application 112" may refer to any of the applications App1 (app 112a), App2 (app 112b), or App3 (app 112c), either singularly or collectively. Similarly, the term "device 110" may refer to any of the devices 110a, 110b, or 110c, either singularly or collectively. System 10 further comprises one or more enterprise back-end systems 120, shown here as back-end systems 120a and 120b.

Server 100 may communicate with client applications 102 via various communications links 130a, 130b, and 130c as well as various delivery channels (not shown). For example, server 100 may communicate with App1 and App2 using cellular and/or Wi-Fi connections to the Internet, and server 100 may communicate with App3 using a connection to the Internet. Server 100 may further communicate with App1, App2, and App3 over various delivery channels, including but not limited to e-mail, SMS, and push notifications. Server 100 may communicate with enterprise back-end systems 120 using communication links 132, shown here as links 132a and 132b. Communication links 132a and 132b, for example, may be connections to the Internet or private network connections. Enterprise back-end systems 120 may further comprise databases 122, such as database 122a as shown here. Back-end system 120b may likewise further comprise database 122b (not shown). Server 100 may request and retrieve data objects from back-end systems 120, and may effect manipulation of data objects stored on the back-end systems 120 by sending appropriate messages for creating, updating, and deleting such data objects. Moreover, server 100 may send messages to back-end systems 120 to link or associate one data object with one or more other data objects using data processing facilities comprising the back-end systems 120. Server 100 may likewise send messages to back-end systems 120 to unlink or dissociate linked or associated data objects.

Client applications App1, App2, and App3 may interact with each other by sharing and exchanging data and messages through server 100. In fact, client applications 112 are configured to communicate with back-end systems 120, and server 100 acts as an intermediary to process all messages and notifications among the client applications 112 and back-end systems 120. The various client applications 112 may be associated with a single enterprise, such as a single business entity, or may be associated with multiple entities that cooperate or share an affiliation. For example, client applications 112 may be associated with a bank or other financial institution, a healthcare provider network, or another enterprise.

Figure 1B:
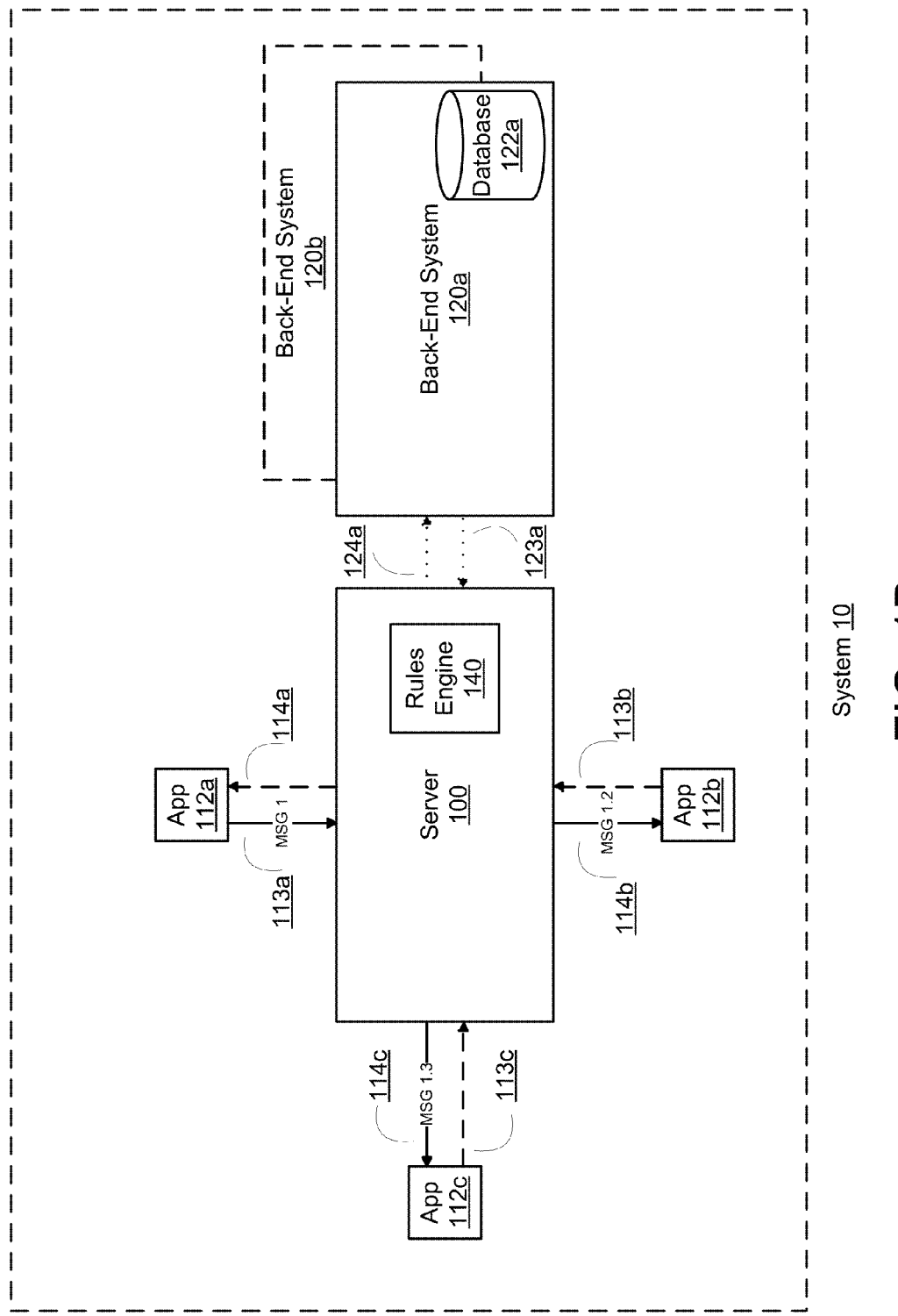
FIG. 1B illustrates an example of a system for transforming and augmenting messages shared among applications in real-time according to an embodiment of the disclosed subject matter.

Referring now to FIG. 1B, the system 10 of FIG. 1A is illustrated again. In FIG. 1B, the devices 110 are not shown, but it is to be understood that the client applications 112 are running on devices 110. Also, communications links 130 and 132 are not shown, but it is to be understood that they are used to send and receive messages 113, 114, 123, and 124 as described herein. As shown in FIG. 1B, server 100 receives messages 113a, 113b, and 113c from App1 (app 112a), App2 (app 112b), and App3 (app 112c), respectively, as indicated by the arrows and numbered elements. Server 100 sends messages 114a, 114b, and 114c to App1 (app 112a), App2 (app 112b), and App3 (app 112c), respectively, as indicated by the arrows and numbered elements. Server 100 also receives messages 123a from enterprise back-end system 120a and sends messages 124a to enterprise back-end system 120a as indicated by the arrows and numbered elements.

Server 100 illustratively receives message 113a, labeled as "MSG 1" from App1 (app 112a). Server 100 delivers transformed message 114b ("MSG 1.2") to App2 (app 112b) and delivers transformed message 114c ("MSG 1.3") to App3 (app 112c). Messages 114b and 114c are context-specific and scope-specific messages that are transformed versions of the original message 113a. That is, server 100 has transformed MSG 1 into MSG 1.2 and MSG 1.3. In some cases, server 100 may obtain additional contextual information from the other messages 113b and 113c received by server 100 and add this additional contextual information to MSG 1 in order to create transformed messages MSG 1.2 and MSG 1.3. Server 100 may also request and receive other data and/or messages to and from enterprise back-end system 120. For example, server 100 may request (via message 124a) data from enterprise back-end system 120a. Server 100 may receive (via message 123a) data from enterprise back-end system 120a, retrieved from database 122a, and use this data as additional contextual information to be added to MSG 1.

Figure 2:
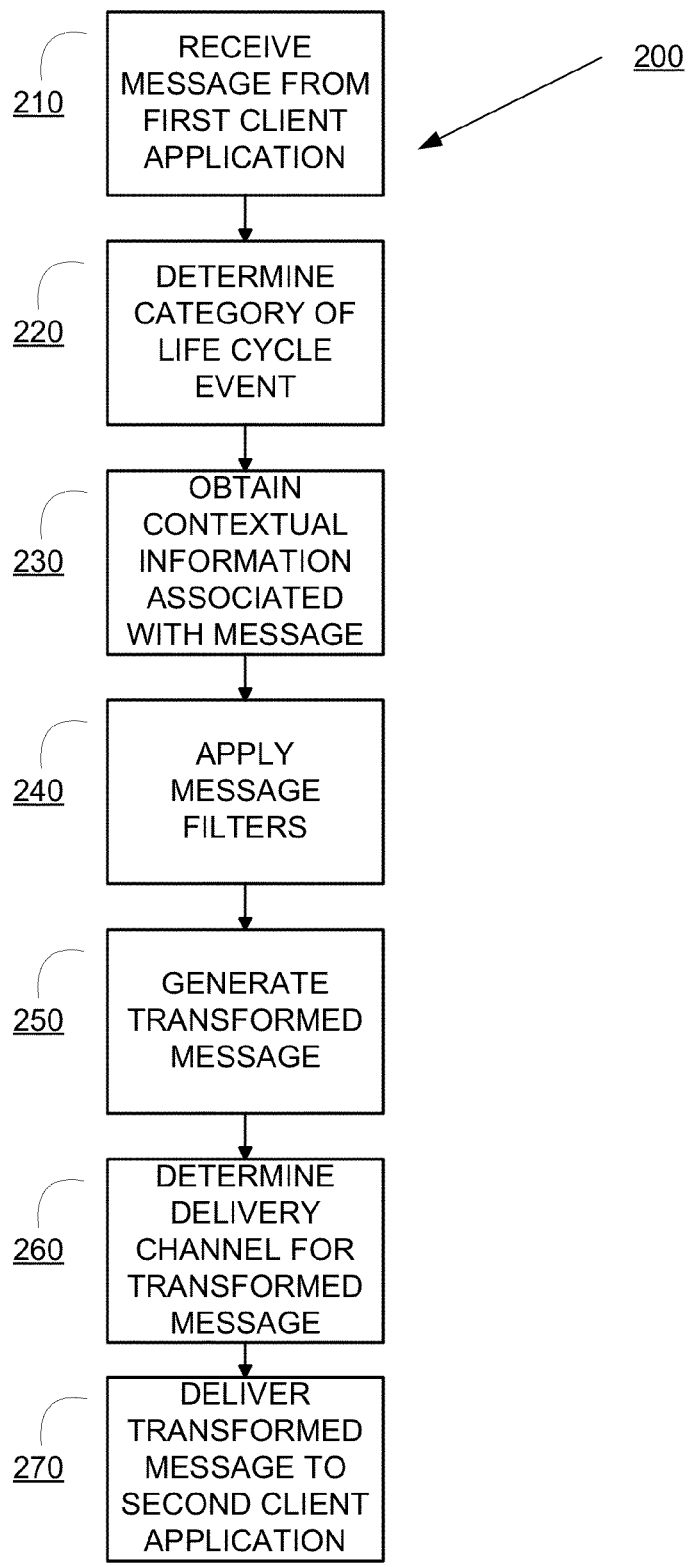
FIG. 2 is a block diagram illustrating a method for processing messages according to an embodiment of the disclosed subject matter.

FIG. 2 is a block diagram illustrating a method for processing messages according to an embodiment of the disclosed subject matter. The method 200 begins at step 210 with the block labeled "RECEIVE MESSAGE FROM FIRST CLIENT APPLICATION." The method 200 proceeds to step 220 with the block labeled "DETERMINE CATEGORY OF LIFE CYCLE EVENT." The method 200 continues with step 230 with the block labeled "OBTAIN CONTEXTUAL INFORMATION ASSOCIATED WITH MESSAGE." The method 200 continues with step 240 with the block labeled "APPLY MESSAGE FILTERS." The method 200 continues with step 250 with the block labeled "GENERATE TRANSFORMED MESSAGE." The method 200 continues with step 260 with the block labeled "DETERMINE DELIVERY CHANNEL FOR TRANSFORMED MESSAGE." The method 200 continues with step 270 with the block labeled "DELIVER TRANSFORMED MESSAGE TO SECOND CLIENT APPLICATION."

Referring still to FIG. 2, the method 200 is further described in an example with additional reference to FIG. 1B. In this example, the server 100 receives MSG 1 (113a) from App1 (app 112a) at step 210. The server 100 may receive MSG 1, for example, through e-mail, SMS, push notification, or by another delivery channel. The received MSG 1 may represent any number of a wide variety of transactions. For example, the received MSG 1 could be related to a financial transaction, a vacation request, an emergency event, and the like.

Continuing with this example, the server 100 determines the category of life cycle event associated with MSG 1 (113a) at step 220. In this context, the term "life cycle event" refers to a transaction on a data object maintained on a back-end system 120a. The data object is associated with the transaction represented by MSG 1. Examples of life cycle events include CREATE, UPDATE, DELETE, SHARE, and ASSOCIATE. A data object may be created, updated, deleted, shared, or associated, as will be further explained by examples. Each life cycle event on a data object triggers a notification, and different types of life cycle events may trigger different notification scenarios. For example, a salesman may enter details of a new sales transaction using App1 (112a) on his mobile phone, and this action will create a new purchase order data object on back-end system 120a. The entry of the new sales transaction may trigger, for example, a notification to the salesman's manager. The salesman may later update the details of the transaction, such as to change the quantity, which will update the purchase order data object on the back-end system 120a. The updating of the transaction may trigger, for example, a different notification to a different sales manager. Alternatively, the salesman may delete the transaction, which will mark the purchase order data object for deletion. In another example, a physician using App1 may wish to refer a patient to a specialist working within the same organization or healthcare provider network and may share the patient's medical chart. In another example, a manager using App1 in a time-off approval system may need to share a vacation request with his administrative assistant. This action will trigger a notification to the administrative assistant. In another example, a user of App1 may create a new lead in a customer relationship management (CRM) system (that is part of a back-end system 120a). The user may determine that the lead belongs to an already existing account in the system, and may associate the lead with that account. This action may trigger, for example, a notification to the user responsible for the associated account. Life cycle events may be initiated by the server 100 in accordance with pre-defined rules or other logic configured in the rules engine 140. Thus, for example, an ASSOCIATE event may occur in the absence of a user of App1 initiating the association.

Continuing with this example, the server 100 obtains contextual information associated with MSG 1 (113a) at step 230. As used herein, the term "contextual information" may, for example, refer to meta-information related to MSG 1, including but not limited to details of the device from which the message originated (e.g., device identifier, operating system, location, phone number), details about the App1 (112a) (e.g., version), details about the user of App1 (e.g., role, name or username, email address, logged in status). Contextual information may also include, for example, additional information obtained from the enterprise back-end system 120a. For example, contextual information related to an emergency event message from a patient using App1 may include the patient's electronic health records. Contextual information may also be related to specific events or messages. For example, a patient's electronic health records may comprise contextual information related to a specific event or message such as an emergency event. In another example, contextual information may include the fact that a specific sale exceeds $1 million.

Continuing with this example, the server 100 applies message filters to MSG 1 (113a) at step 240. The purpose of the message filters is to customize transformed messages for the recipients of the transformed messages. An administrator of system 10 may configure the appropriate filters within rules engine 140. Thereafter, rules engine 140 processes incoming messages according to those filters. Rules engine 140 includes, for example, role filters, application filters, and state filters. Role filters specify how a message is processed based on the intended recipient's role. For example, within the context of a healthcare application system, various roles may include patient, physician, ambulance driver, and hospital call center operator. Depending on the intended recipient's role, the received MSG 1 may be transformed differently. For example, different sets of contextual information may be added to transformed messages MSG 1.2 (114b) and MSG 1.3 (114c), where the intended recipients of these transformed messages have different role attributes. Application filters specify how a message is processed based on the target application receiving a transformed message. State filters specify how a message is processed depending on the intended recipient's state. For example, the state may relate to an intended recipient's login status, which can affect the delivery channel selected for the transformed message or whether a message is delivered at all. For example, if the intended recipient is currently logged in, the transformed message may be delivered via a push notification, whereas if the intended recipient is not currently logged in, the transformed message may be delivered via email or SMS. As another example, the state may relate to whether a particular user is assigned or not assigned. If the user is assigned, he may receive a transformed message, whereas if the user is not assigned then he may not receive a transformed message.

Continuing with this example, the server 100 generates the transformed messages, such as MSG 1.2 (114b) and MSG 1.3 (114c) at step 250. The transformed messages may be customized based on, for example, role, application, and state filters. The transformed messages may be augmented with contextual information obtained from the received MSG 1 (113a), other messages 113b and 113c, as well as data retrieved from the enterprise back-end system 120a and delivered to server 100 via message 123a.

Continuing with this example, the server 100 determines the delivery channel for the transformed messages, such as MSG 1.2 (114b) and MSG 1.3 (114c) at step 260. The determination may be based on, for example, the filters configured in rules engine 140 (e.g., role, application, and state filters) as well as the category of life cycle event associated with the received MSG 1 (113a). The delivery channels for MSG 1.2 and MSG 1.3 may be different, and may be, for example, one of email, SMS, or a push notification service. Alternatively, multiple delivery channels may be selected for a single transformed message.

Continuing with this example, the server 100 delivers the transformed messages, such as MSG 1.2 (114b) and MSG 1.3 (114c) at step 270. The server 100 delivers the transformed messages MSG 1.2 and MSG 1.3 via the delivery channels determined at step 260. In another example, a transformed message may require a response and the server 100 may repeat delivery of that transformed message, either through the same delivery channel or through an alternative delivery channel, until server 100 receives a response.

Figure 1C:
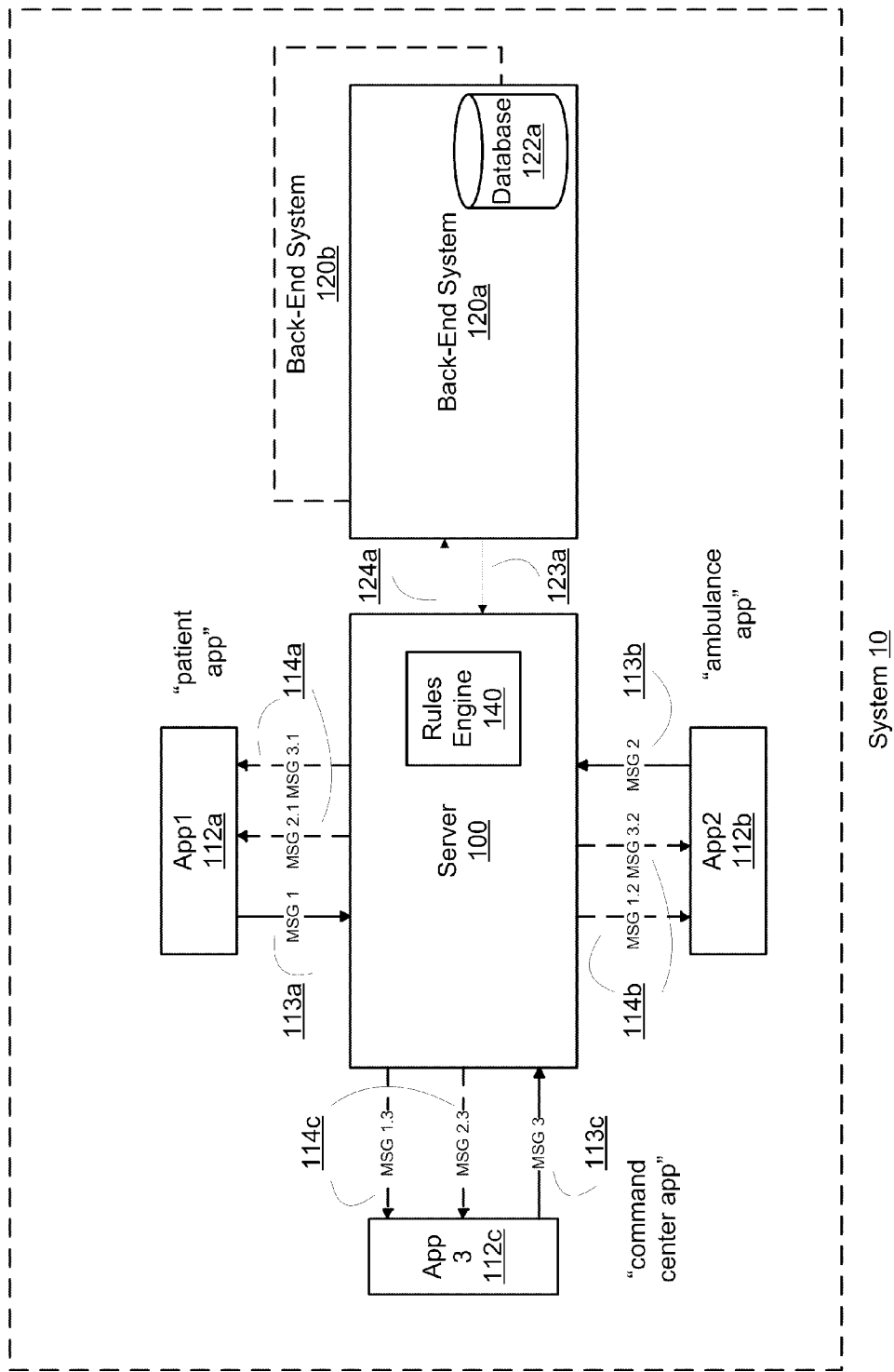
FIG. 1C illustrates an example in the context of a health emergency event of a system for transforming and augmenting messages shared among applications in real-time according to an embodiment of the disclosed subject matter.

Referring now to FIG. 1C and with reference to FIGS. 3, 4A, 4B, 5A, and 5B, the foregoing may be more easily understood by the description of particular examples. FIG. 1C illustrates an example in the context of a health emergency event of a system for transforming and augmenting messages shared among applications in real-time according to an embodiment of the disclosed subject matter. FIG. 1C is identical to FIG. 1B, except that additional messages are illustrated, and the client applications 112 have been further labeled. In FIG. 1C, system 10 comprises server 100 communicating with client applications App1 112a ("App1" or "patient app"), App2 112b ("App2" or "ambulance app"), and App3 112c ("App3" or "command center app") via communications links 130a, 130b, and 130c (not shown). Server 100 further comprises rules engine 140. System 10 further comprises enterprise back-end system 120a, which communicates with server 100 via communication link 130d (not shown). Enterprise back-end system 120a further comprises database 122a. The various client applications 112 exchange messages 113 and 114 with server 100 as indicated by the arrows and numbered elements. App1 112a sends messages 113a, including MSG 1 as shown to server 100. App2 112b sends messages 113b, including MSG 2 as shown, to server 100. App3 112c sends messages 113c, including MSG 3 as shown, to server 100. Server 100 sends messages 114a to App1 112a, including the shown MSG 2.1 and MSG 3.1. Server 100 sends messages 114b to App2 112b, including the shown MSG 1.2 and MSG 3.2. Server 100 sends messages 114c to App3 112c, including the shown MSG 1.3 and MSG 2.3. Messages 113a, 113b, and 113c, (including MSG 1, MSG 2, and MSG 3) sent to server 100 are represented by arrows with solid lines. Messages 114a, 114b, and 114c, (including MSG 2.1 MSG 3.1, MSG 1.2, MSG 3.2, MSG 1.3, and MSG 2.3) sent by server 100 are represented by arrows with dashed lines. Additionally, server 100 also receives messages 123a from enterprise back-end system 120a and sends messages 124a to enterprise back-end system 120a as indicated by the arrows and numbered elements. Messages 123a and 124a between server 100 and enterprise back-end system 120a are represented by arrows with dotted lines. FIGS. 3A-3D illustrate examples of notifications and messages associated with this healthcare scenario. Enterprise back-end system 120a may be a patient emergency management system (hereinafter also referred to as "PEMS" or "PEMS 120a").

Referring still to FIG. 1C, App1 112a is a patient app that may be distributed publicly by a healthcare organization. The patient app may, for example, run on a device 110a (not shown) such as an Apple iPhone™ running iOS™. The patient uses this app when he encounters a health emergency and needs immediate attention from paramedics. Using the patient app in this manner provides the same function as that of a 911 emergency call in the United States. When a healthcare emergency is triggered by a patient, an emergency event is created on the device 110a and sent to the server 100 via MSG 1 (113a). This is the medium for creating health emergency events. In response, server 100 may send a message (not shown) to app 112a confirming the emergency event. By triggering an emergency event, the patient app causes the server 100 to CREATE an emergency event data object on the PEMS 120a (i.e., back-end system 120a). The data object created by the server 100 on the PEMS 120a for this emergency event may include, for example, data fields such as emergency_event_ID, emergency_latitude, emergency_longitude, a timestamp, and a short description of the emergency. Context information for MSG 1 may include, for example, patient ID information (e.g., name/username, phone number), device ID information, and the user's location (e.g., latitude and longitude coordinates). The server 100 may obtain additional context information, for example, by retrieving the patient's electronic health records from back-end system 120a (and database 122a). This information may be sent in message 123a from back-end system 120a to server 100 as indicated. Alternatively, the patient's electronic health records may reside within a separate back-end system 120b and may be retrieved in a similar fashion. The patient app may receive messages via Apple™ push notifications (i.e., delivery channel). When the server 100 CREATES the emergency event in response to MSG 1, this action triggers a notification. The rules engine 140 applies message filtering rules to deliver the transformed messages MSG 1.2 and 1.3. In this example, the filtering rules specify that the emergency event message be directed to ALL App3 (command center app) users in the system via MSG 1.3. The server 100 delivers message 114c as MSG 1.3. In this case, the emergency event message MSG 1 is not directly transformed into a MSG 1.2 (message 114b) sent to the ambulance app, but contextual information associated with MSG 1 may be included in another message MSG 3.2 as described further herein.

Referring still to FIG. 1C, App2 112b is an ambulance app that is used by ambulance drivers employed or contracted by the healthcare organization. The ambulance app may, for example, run on an Android™-based tablet device 110b (not shown). The ambulance app periodically transmits to the server 100 updates of its locations, so that call center operators (i.e., users of App3 112c as described further herein) know the locations of all the ambulances in the field. When a location event is triggered by the ambulance app, a location event is created on the device 110b and sent to the server 100 via MSG 2 (113b). This is medium for triggering location events on the server 100, and ultimately in the PEMS 120a. By triggering a location event, the ambulance app causes the server 100 to CREATE or UPDATE a location event data object on the PEMS 120a. The data object for a location event created or updated by the server 100 on the PEMS 120a may include, for example, data fields such as vehicle_ID, timestamp, location_latitude, and location_longitude. Context information for MSG 2 may include, for example, ambulance ID information (e.g., vehicle identifier), and driver ID information (e.g., driver's name/username, phone number). The ambulance app may receive messages via Google™ cloud messaging (i.e., delivery channel). When the server 100 CREATES or UPDATES the location event in response to MSG 2, this action triggers a notification. The rules engine 140 applies message filtering rules to deliver the transformed messages MSG 2.1 and 2.3. In this example, the filtering rules specify that the location event message be directed to ALL App3 (command center app) users in the system via MSG 2.3. The server 100 delivers message 114c as MSG 2.3. The filtering rules also specify that the location event message be directed to the specific patient for whose emergency event the particular ambulance has been assigned. The server 100 delivers message 114a as MSG 2.1. If the ambulance is not currently assigned to an emergency event, then MSG 2.1 is not delivered.

Referring still to FIG. 1C, App3 112c is web application used by call center operators on a desktop PC device 110c (not shown), and may be called the command center app. The command center app receives emergency events from the patient app and location events from the ambulance app via the server 100. The command center app is used to track the whereabouts of the ambulances and also for tracking patient emergency events. Call center operators use the command center app to dispatch the appropriate ambulance to the patient who triggered an emergency event as described above. When the command center app receives an emergency event and a call center operator assigns the emergency event to a particular ambulance, an ambulance assignment event is created on the device 110c and sent to the server 100 via MSG 3 (113c). This is medium for triggering ambulance assignment events on the server 100, and ultimately in the PEMS 120a. By triggering an ambulance assignment event, the command center app causes the server 100 to CREATE an ambulance assignment event data object. The data object for an ambulance assignment event created by the server 100 on the PEMS 120a may include, for example, data fields such as the ambulance_ID and driver_ID information obtained from App2, emergency_event_ID from App1, and a timestamp for the assignment. Context information for MSG 3 may include, for example, the username of the call center operator. The command center app may receive messages via browser using a web sockets protocol (i.e., delivery channel). When the server 100 CREATES the ambulance assignment event in response to MSG 3, this action triggers a notification. The rules engine 140 applies message filtering rules to deliver the transformed messages MSG 3.1 and 3.2. In this example, the filtering rules specify that the ambulance assignment event message be directed to the particular patient whose emergency event has been assigned as well as the particular ambulance driver. The transformed messages MSG 3.1 and MSG 3.2 will contain message details so that both of these parties are aware of the details of each other including, for example, phone numbers and names. The transformed messages 3.1 and MSG 3.2 are transformations of the assignment message (MSG 3) augmented with the appropriate contextual information such as the locations of both parties.

The server 100 can further send the patient app and the ambulance app additional context- and scope-specific messages based on the emergency event message MSG 1, the location event messages MSG 2, and the assignment message MSG 3. For example, the call center operator using the command center app can additionally add a hospital assignment to the assignment message MSG 3, and appropriate transformed messages such as a new transformed message MSG 3.2 may be sent to the ambulance app. Moreover, as the server 100 continues to receive new location event messages MSG 2 from the ambulance app, a new transformed message MSG 2.1 may be sent to the patient app in order to provide the patient with the ambulance's updated location.

Referring now to FIGS. 3A-3D, 4, 5A-5B, and with reference to FIG. 1C and the corresponding description thereof, the foregoing is further illustrated by examples of notifications and transformed messages delivered by a server to interconnected client applications in real-time according to an embodiment of the disclosed subject matter.

Figure 3B:
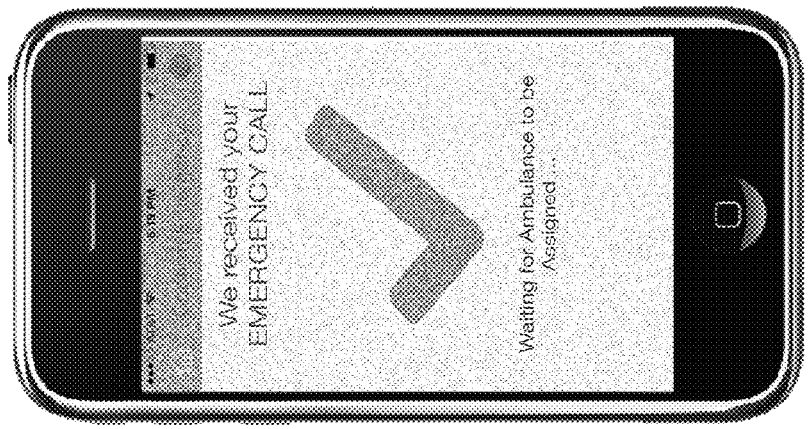
FIGS. 3A-3D illustrate examples in the context of a health emergency event of notifications and transformed messages delivered in real-time to a patient app according to an embodiment of the disclosed subject matter.
Figure 3A:
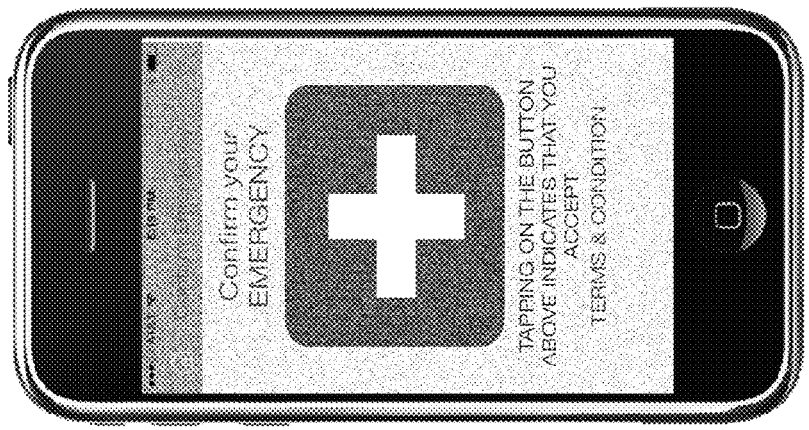

FIG. 3A illustrates an example of a message displayed to a patient using the patient app 112a of FIG. 1C after the patient has initiated an emergency event. In FIG. 3A, the patient app 112a displays a screen with the message "Confirm your EMERGENCY." After the user confirms the emergency, the patient app 112a transmits the emergency event to the server 100 via message 113a (MSG 1).

FIG. 3B illustrates an example of a notification displayed to a patient using the patient app 112a of FIG. 1C after the patient has initiated an emergency event and the server 100 has created the emergency event on back-end system 120a. In FIG. 3B, a confirmation message alerts the user "We have received your EMERGENCY CALL. Waiting for Ambulance to be Assigned . . . ."

Figure 4:
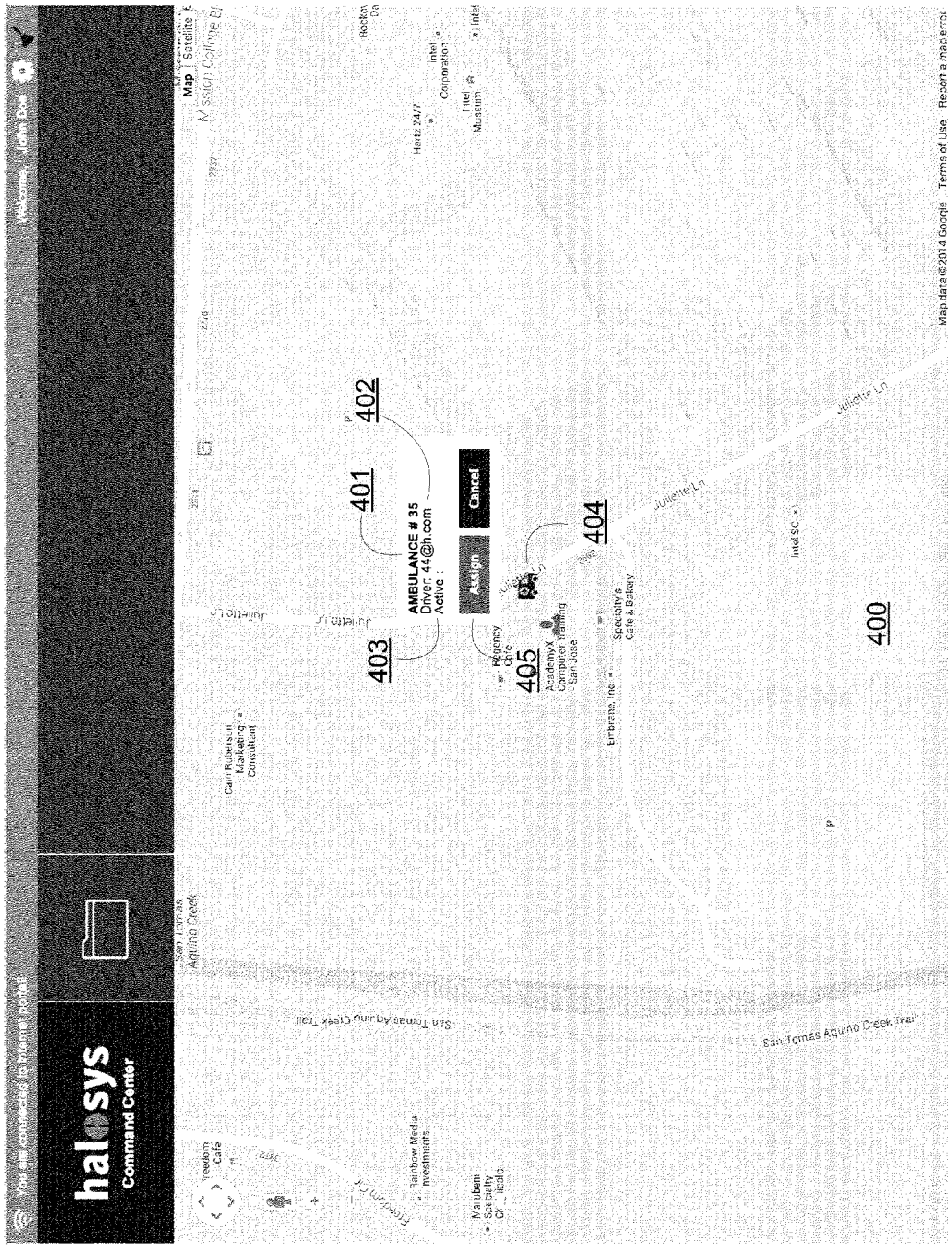
FIG. 4 illustrates an example in the context of a health emergency event of a notification and transformed messages delivered in real-time to a command center app according to an embodiment of the disclosed subject matter.

FIG. 4 illustrates an example of a notification displayed to a call center operator using the command center app 112c of FIG. 1C following the creation of an emergency event and an ambulance location event. In FIG. 4, a graphical representation 400 includes a map. Vehicle ID information 401 identifies a particular ambulance. Driver ID information 402 identifies the ambulance driver's email address. Status information 403 identifies the ambulance as being Active and not currently otherwise assigned. Graphical icon 404 shows the ambulance's current location on the map. Clicking assignment button 405 allows the call center operator to assign the currently displayed ambulance to an emergency event.

Figure 3D:
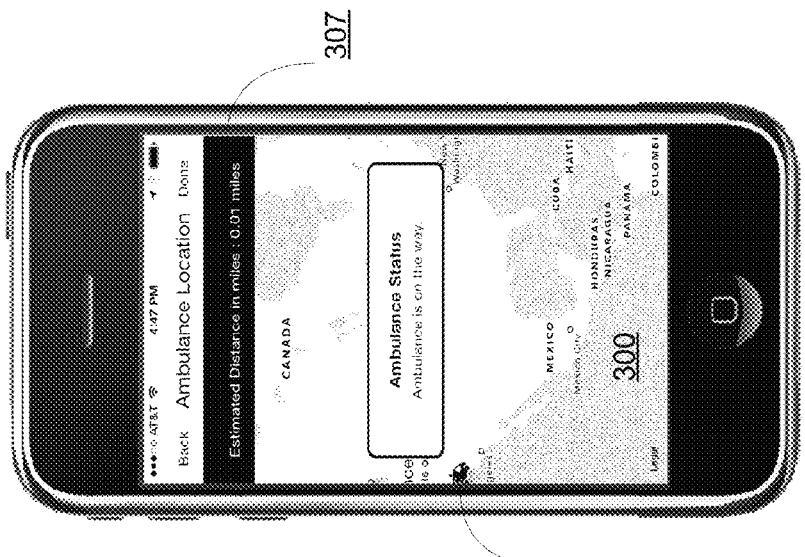
Figure 3C:
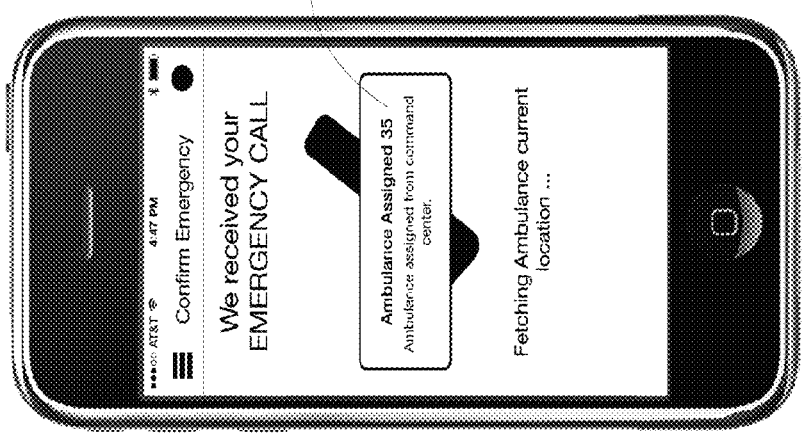

FIG. 3C illustrates an example of a notification displayed to a patient using the patient app 112a of FIG. 1C after a call center operator has assigned an ambulance to the patient's emergency event. In FIG. 3C, the notification includes vehicle ID information 301 corresponding to the vehicle ID information 401 of FIG. 4 and identifying the particular ambulance (i.e., 35) assigned to the patient's emergency event.

FIG. 3D illustrates an example of a notification displayed to a patient using the patient app 112a of FIG. 1C after a location event update from the ambulance. In FIG. 3D, the ambulance's updated location is displayed via graphical icon 304 and location information 307.

Figure 5B:
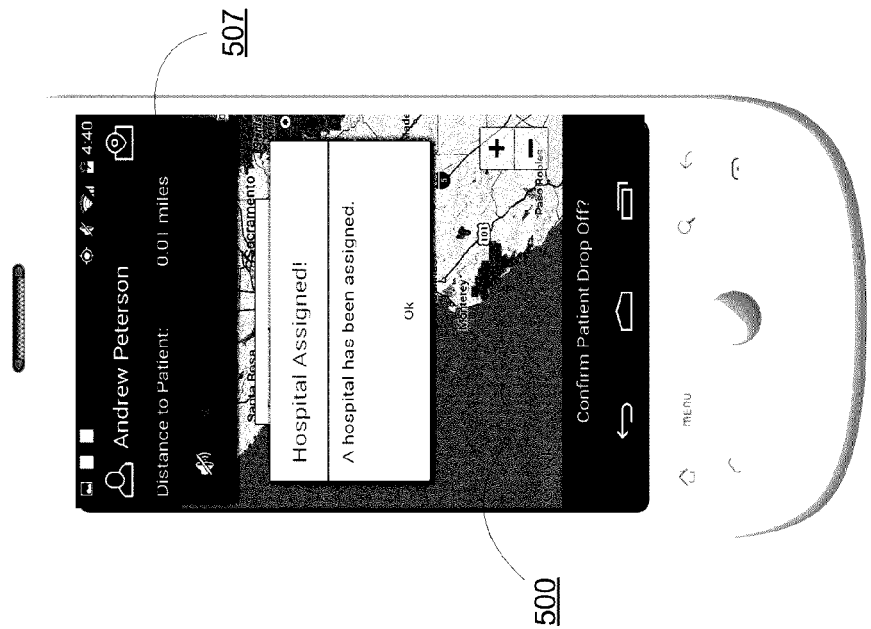
FIGS. 5A and 5B illustrate examples in the context of a health emergency event of notifications and transformed messages delivered in real-time to an ambulance app according to an embodiment of the disclosed subject matter.
Figure 5A:
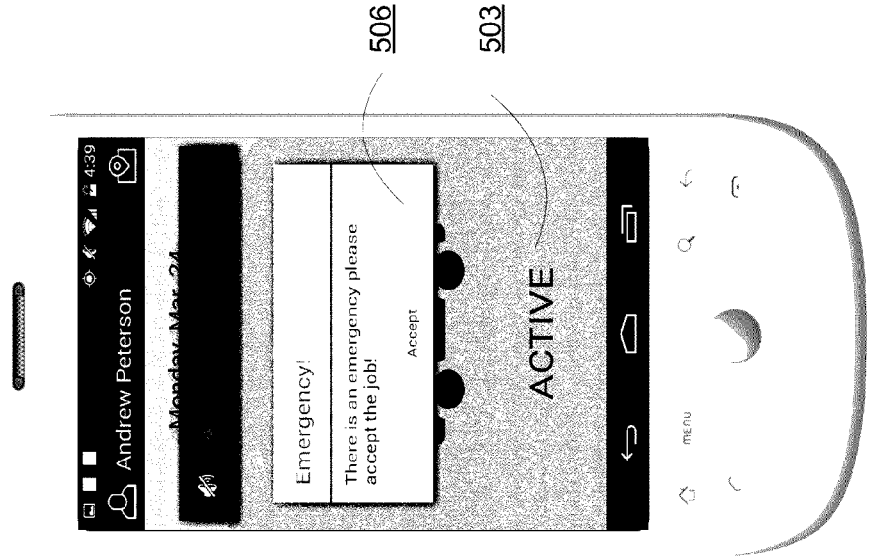

FIG. 5A illustrates an example of a notification displayed to an ambulance driver using the ambulance app 112b of FIG. 1C after a call center operator has assigned the ambulance to an emergency event. In FIG. 5A, the ambulance driver's status information 503 is shown as being ACTIVE, which corresponds to the status information 403 of FIG. 4. Clicking on the graphical button 506 allows the ambulance driver to accept the assignment.

FIG. 5B illustrates an example of a notification displayed to an ambulance driver using the ambulance app 112b of FIG. 1C after a call center operator has assigned the ambulance to a particular hospital. In FIG. 5B, the notification includes a graphical map representation 500 as well location information 507 of the patient's location.

In the foregoing description and examples of various embodiments, the transformation and/or augmentation of notifications and messages into context-specific and scope-specific notifications and messages occurs in real-time across multiple applications operating on multiple platforms utilizing multiple delivery channels to multiple users having multiple roles and permissions for access and entitlement to certain contextual information. Thus, for example, in system of interconnected applications used by a healthcare organization, access to certain contextual information in transformed and/or augmented notifications and messages, such as a patient's electronic health records, may be restricted based on an intended recipient's role so that the electronic health records are included in a transformed message delivered to an ambulance driver or a hospital clinician but are not included in a transformed message delivered to a call center operator.

Referring again to FIG. 1A, the rules engine 140 provides a high degree of flexibility and customizability with regard to the transformation and/or augmentation of notifications and messages. The rules engine 140 may comprise predefined and configurable templates that govern the transformation of notifications and messages. An administrator of the system 10 of FIG. 1A may define and configure such templates using an administrator control panel comprising a graphical user interface. The administrator control panel may provide, for example, drag-and-drop functionality for selection of various elements used to construct the message filters and message processing templates.

Figure 6A:
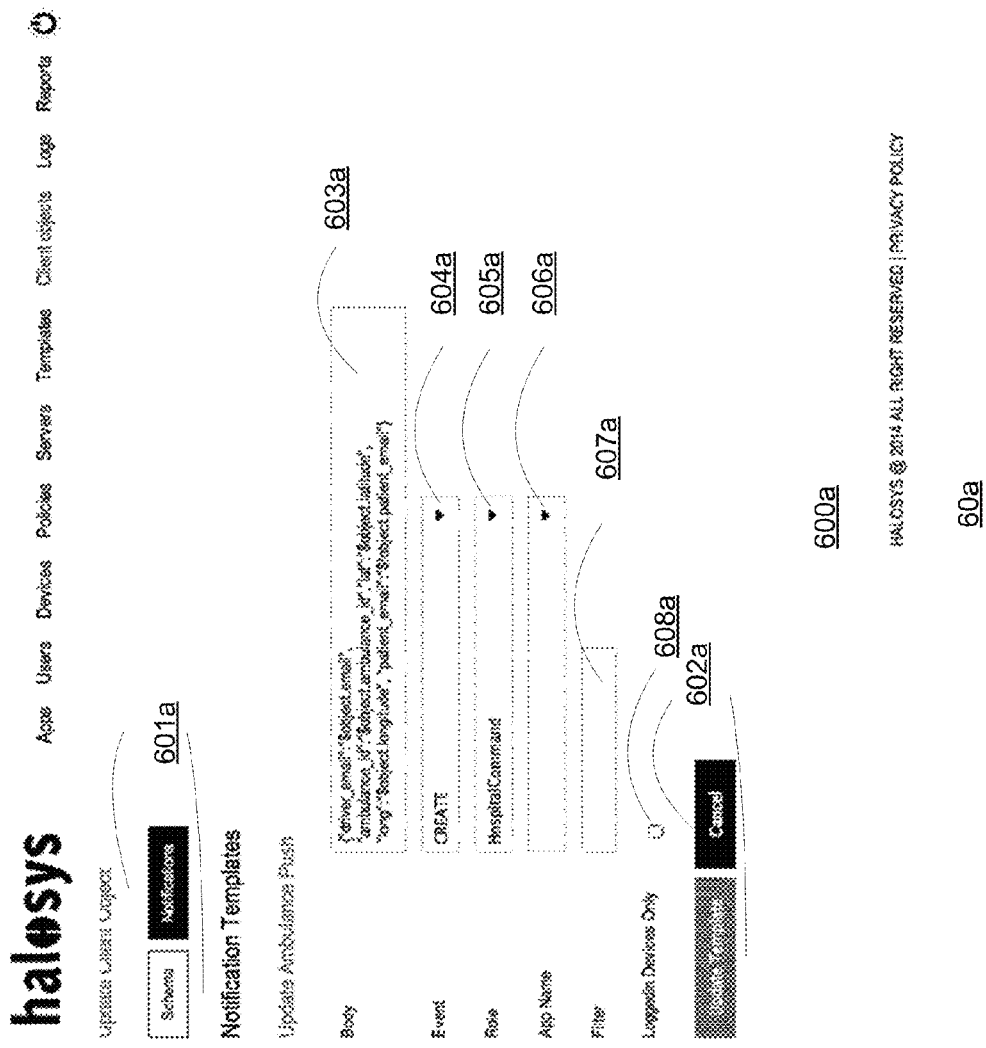
FIGS. 6A and 6B illustrate examples of notification templates or message processing templates which can be configured and used by a rules engine according to an embodiment of the disclosed subject matter.
Figure 6B:
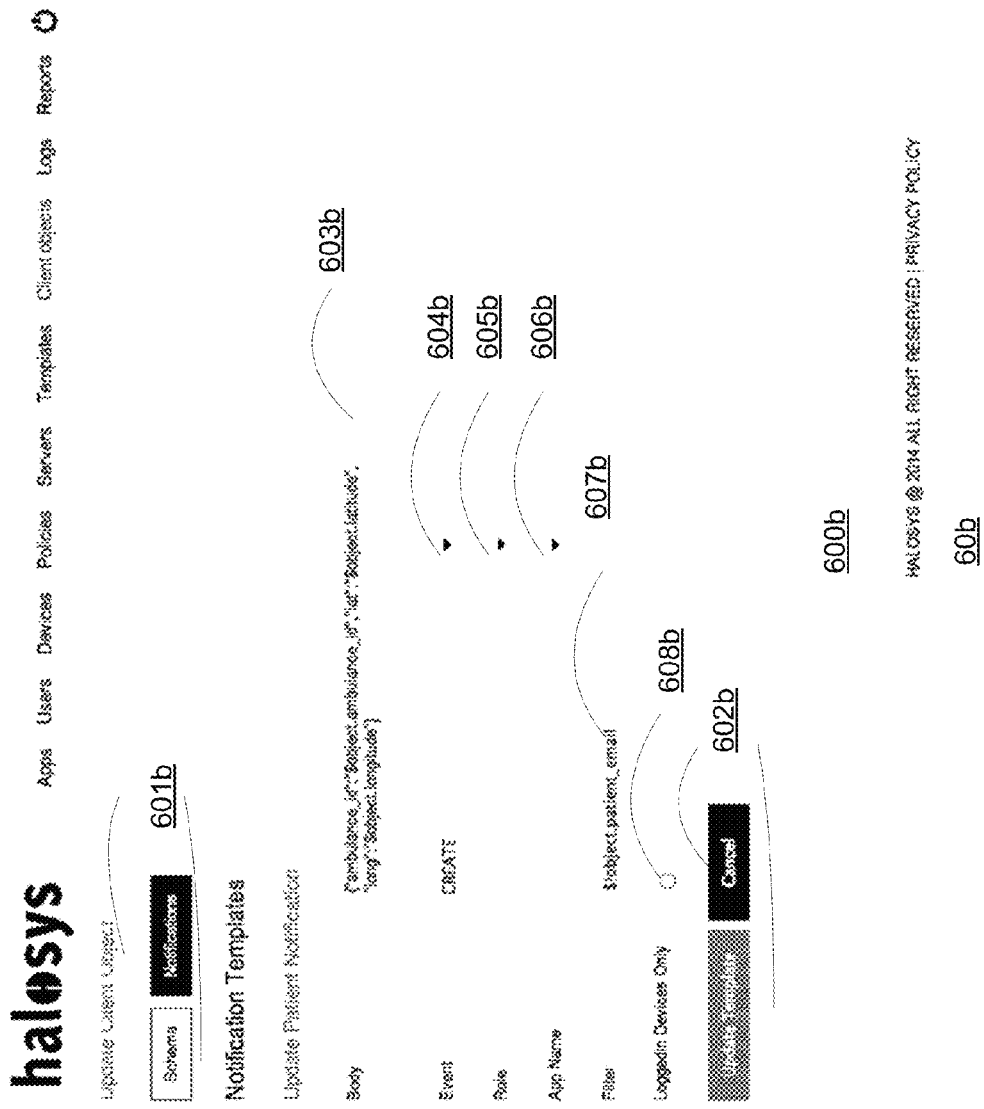

Referring now to FIGS. 6A and 6B, examples of message processing templates or notifications template are illustrated. In FIGS. 6A and 6B, notification templates 600 are displayed in an administrator console window 60, and comprises a graphical user interface with elements such as buttons 601 and 602, fillable fields 603 and 607, pulldown menus 604, 605, and 606, and checkboxes 608. Other graphical user interface elements, such as radio buttons, may also be employed. The administrator console window 60 may be accessed, for example, through a web-based application interface to the rules engine 140 of FIGS. 1A-1C. Buttons 601 and 602 allow the administrator to initiate creating and updating notification templates. As shown, fillable field 603 allows the administrator to select business data objects and data object fields to be included in the body of a notification message. Pulldown menu 604 allows an administrator to specify and configure the type of life cycle event associated with the notification. Thus the administrator can configure, for example, separate CREATE and UPDATE rules or filters for notifications, as has been described, for example, with reference to FIG. 2. Pulldown menus 605 and 606 allow the administrator to specify or configure the role of the intended recipient of the notification message, as well as the app name, respectively, which correspond to the role and application filters as have been described, for example, with reference to FIG. 2. Fillable field 607 allows the administrator to select and configure additional filters. Checkbox 608 allows the administrator to specify whether the notification message is delivered to logged in devices only, which corresponds to the state filter as has been described, for example, with reference to FIG. 2.

Referring now to FIG. 6A and with reference to FIGS. 1A-1C and the accompanying description thereof, the particular notification template 600 shown here corresponds to a notification message template for an ambulance location event as was described with reference to FIG. 1C and the message MSG 2 (113b). The fillable field 603a corresponding to the body of the message includes data object fields including the driver's email address, the ambulance's vehicle ID information, and the vehicle's longitude and latitude coordinates. In this example, pulldown menu 604a is configured for a CREATE rule. Thus, the particular notification template 600a is applied when an ambulance creates a location event on the server 100. The creation of a location event triggers a notification, which in this case is configured to be delivered to call center operators using the command center app (112c), as indicated by the selection "HospitalCommand" from pulldown menu 605a. Checkbox 608a is unchecked, indicating that the notification message triggered by the creation of the ambulance location event should be delivered to ALL users of the command center app, not only those who are logged in.

Referring now to FIG. 6B and with reference to FIGS. 1A-1C, FIG. 6A and the accompanying description thereof, a notification template 600b is illustrated. The particular notification template 600b shown here corresponds to a notification message template for an ambulance location event as was described with reference to FIG. 1C and the message MSG 2 (113b). The fillable field 603b corresponding to the body of the message includes data object fields including the driver's email address, the ambulance's vehicle ID information, and the vehicle's longitude and latitude coordinates. In this example, pulldown menu 604a is configured for a CREATE rule. Thus, the particular notification template 600b is applied when an ambulance creates a location event on the server 100. The creation of a location event triggers a notification, which in this case is configured to be delivered to a specific patient using the patient app (112a) and to whose emergency event the ambulance is assigned, as indicated by the entry "$!object-.patient_email" from fillable field 607b. Thus, notification template 600b is configured for a notification message to be sent to a patient relating to an ambulance location event being created on the server 100.

It will be appreciated by those skilled in the art that changes could be made to the examples described above without departing from the broad inventive concept thereof. It is understood, therefore, that this invention is not limited to the particular examples disclosed, but it is intended to cover modifications within the spirit and scope of the present invention as defined by the appended claims.

We claim:

1. A method comprising:
receiving at a server from a first client application a first message that triggers a life cycle event for a data object managed by the server;
obtaining contextual information associated with the first message;
applying a configurable message filter to the first message to create a context-specific transformed message that includes a portion of the contextual information;
delivering the transformed message in real-time to a recipient using a second client application;
receiving at the server from a third client application a second message;
obtaining additional contextual information associated with the second message;
applying a configurable message filter to the second message to determine a portion of the additional contextual information to be included in the transformed message; and
including in the transformed message the portion of the additional contextual information associated with the second message.

2. A system comprising:
a first client application;
a second client application;
a set of configurable message filters; and
a server, communicatively coupled to the first client application and the second client application, wherein the server is configured to perform the following:
receive from the first application a first message that triggers a life cycle event for a data object managed by the server;
obtain contextual information associated with the first message;
apply one of the set of configurable message filters to the first message to create a context-specific transformed message that includes a portion of the contextual information and
deliver the transformed message in real-time to a recipient using the second client application;
receive from a third client application a second message;
obtain additional contextual information associated with the second message;
apply a second of the set of configurable message filters to the second message to determine a portion of the additional contextual information to be included in the transformed message; and
include in the transformed message the portion of the additional contextual information associated with the second message.

3. A method comprising:
configuring at a server a message filter for creating a notification of a life cycle event for a data object maintained by a back-end system communicatively coupled to the server;
receiving at the server a first message from a first client application, the first message signifying the life cycle event for the data object;
obtaining contextual information associated with the first message;
applying the message filter to the first message to create a context-specific notification that includes a portion of the contextual information;
delivering the notification in real-time to a specific recipient using a second client application;
configuring at the server a second message filter;
receiving at the server from a third client application a second message;
obtaining additional contextual information associated with the second message;
applying the second message filter to the second message to determine a portion of the additional contextual information to be included in the notification; and
including in the notification the portion of the additional contextual information associated with the second message.

* * * * *